July 13, 1926.

L. J. MORGAN

WEATHER STRIP FOR DOORS, HATCHES, ETC

Filed July 7, 1923

1,592,466

INVENTOR.

BY

ATTORNEYS.

Patented July 13, 1926.

1,592,466

UNITED STATES PATENT OFFICE.

LEWIS J. MORGAN, OF SYRACUSE, NEW YORK.

WEATHER STRIP FOR DOORS, HATCHES, ETC.

Application filed July 7, 1923. Serial No. 650,012.

This invention has for its object a weather strip for doors, particularly for the doors or covers for the compartments in automobile bodies and for the hatches and other openings such as ventilating openings in the cowls or in the roofs of automobile bodies.

The invention consists in a particularly simple weather strip by which the water working or seeping under or between the doors or covers and the door frames is prevented from entering beneath the cover, and in the novel features and in the combinations and constructions hereinafter set forth and claimed.

In describing this invention, reference is had to the accompanying drawings, in which like characters designate corresponding parts in all the views.

Figure 1:
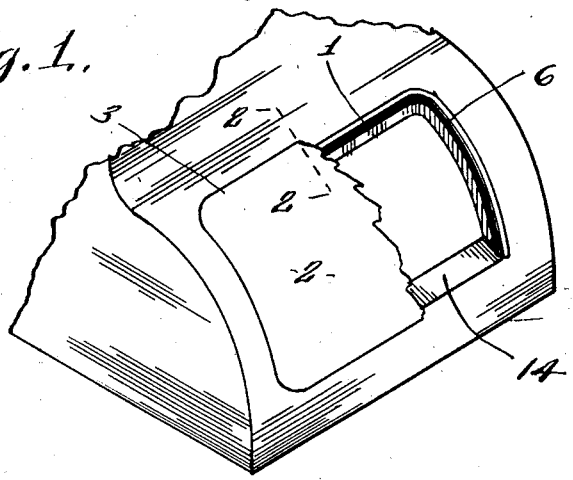
Figure 1, is a fragmentary perspective view of an automobile body, embodying one form of my invention.
Figure 2:
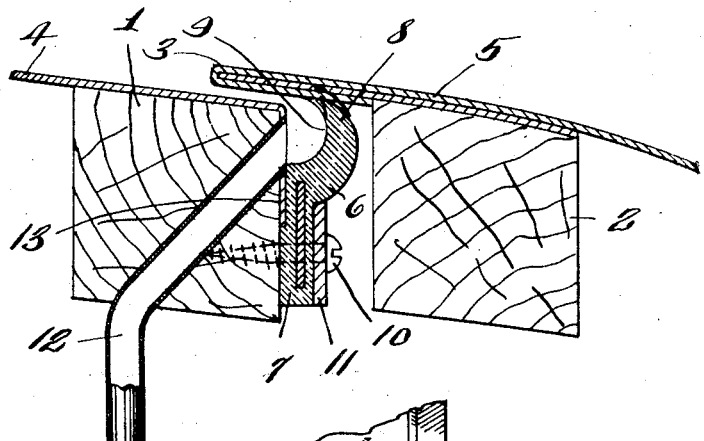
Figure 2, is an enlarged sectional view on line 2—2, Figure 1.

This invention comprises generally a weather strip in the form of a gutter arranged in the door frame or opening beneath the margin of the door, and formed with a channel which forms a gutter opening toward the joint between the door and the door frame in position to receive any water that may seep between the door and the door frame.

In the illustrations embodied in my invention the gutter is shown as carried by the door frame.

1 designates the door frame which is shown as rectangular in form. 2 is the door having its margin as a flange 3, which overlaps the face of the door frame. In an automobile construction the frame is overlaid with the sheet metal body 4, and also the frame of the door is also overlaid with the sheet metal 5.

6 designates the weather strip and is usually formed of yielding material, as rubber, and it is here shown as having a base flange 7 secured at the door frame beneath the cover and an upwardly extending portion 8, usually arcuate in cross section and confining an outwardly facing channel 9 presented towards the outer edge of the door frame, or the joint or crevice between the door and the door frame. Preferably the portion extends above the plane of the door frame in position to be engaged by the marginal flange 3 of the door before the door is completely closed and to be compressed slightly in order to snugly engage the door when the door is completely closed. The base flange is secured to the door frame by screws 10 passing through the metal strap 11, overlying the base flange and through the base flange and into the door frame. The gutter also is provided with a suitable outlet as a pipe 12 leading from the gutter. The pipe is here shown as located in the door frame and opening through a downwardly folded margin 13 of the sheet metal body 4, which margin is opposed to the portion 8 of the weather strip and forms one side of the channel 9.

In Figure 1, the door is shown as rounding and arranged on the downwardly inclined or rounding rear end of an automobile body, and such door is usually hinged at its upper edge. The gutter extends along the upper side and to the two sides of the door frame, and the lower side 14 of the door frame is bevelled so that the water running down the channel 9 in the gutter along the side walls of the door frame will run out along the bevelled face 14. In order that water entering the upper edge of the door opening may discharge quickly, the portion of the weather strip along such upper edge is provided with an outlet 12.

Figure 3:
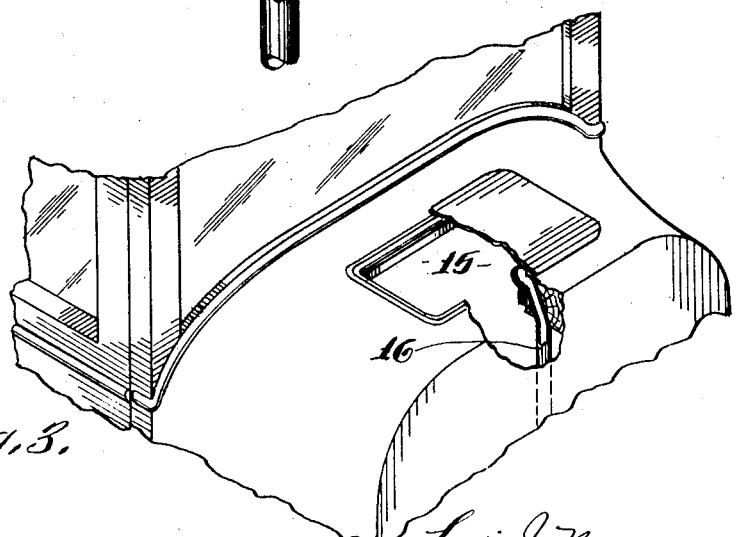
Figure 3, is a perspective view of the cowl of an automobile body having a ventilating opening provided with my invention.

In Figure 3, the weather strip with its channel shown as extending around the entire inner circumference of the door frame opening 15 and the discharge pipe 16 is shown as leading from the lower side of the outlet opening.

This weather strip is particularly advantageous in that it not only receives any water seeping under the cover and prevents it from entering the compartment when closed, but also holds the door from rattling.

What I claim is:

The combination with a door frame, a door having a marginal flange overlapping the door frame, of a weather strip arranged in the door opening, the weather strip being of yielding material and in the form of a channel facing toward the edge of the door, the channel forming a gutter for water entering under said flange and the outer edge of the channel projecting beyond the plane of the door frame in position to be engaged by said flange and compressed when the door is closed.

In testimony whereof, I have hereunto signed my name, at Syracuse, in the county of Onondaga, and State of New York, this 22nd day of June, 1923.

LEWIS J. MORGAN.